United States Patent Office 2,724,068
Patented Nov. 15, 1955

2,724,068

MEASUREMENT OF RADIATION

Allen D. Garrison, Houston, Tex., assignor to Texaco Development Corporation, New York, N. Y., a corporation of Delaware No Drawing. Application September 26, 1952,
Serial No. 311,785

12 Claims. (Cl. 313—93)

This invention relates to measuring of penetrative radiation and more particularly to improvements in a gamma-ray detector of the gas amplification type in which the gaseous filling comprises a mixture of ammonia and one of the rare gases. The principal object of the invention is to provide means for introducing more ammonia into the filling gas when the detector is used at elevated temperatures such as in the making of a radioactivity log of a deep well or bore hole.

In the U. S. Letters Patent No. 2,512,773, granted June 27, 1950, to Gerhard Herzog and Allen D. Garrison, a gaseous filling is disclosed for use in gamma radiation detectors of the pulse producing gas amplification counter type, which filling has been found very effective as a quenching gas for the counter and through the use of which the lifetime of the counter is so extended as to be substantially unlimited. The filling disclosed in the patent comprises a mixture of a small amount of anhydrous ammonia with one of the rare gases such as argon, for example. As stated in the patent a mixture of 2 per cent ammonia and 98 per cent argon has proven to be very satisfactory.

It is sometimes desired to detect and measure gamma radiation when the temperature of the detecting device is relatively high. For instance, in making radioactivity logs of the formations surrounding a bore hole or well, the temperatures in the well sometimes reach 300° F. and even higher and this is, of course, particularly true in deep wells.

It has been found that at elevated temperatures, it is desirable to introduce more ammonia into the counter gas. One explanation for this requirement may be that the ammonia constituent of the quenching gas in a gamma-ray counter tube partly decomposes into nitrogen and hydrogen and this decomposition increases as the temperature is increased. It is known that a decrease in the amount of the ammonia results in improper or inadequate quenching of the counter and a true measurement of the intensity of the gamma radiation is not always obtained. If the percentage of ammonia in the filling gas for the counter is increased initially in an effort to obtain an adequate amount of the ammonia for high temperatures, the results are not entirely satisfactory since this increase in ammonia concentration causes certain unsatisfactory characteristics of the counter at lower or normal temperatures.

In accordance with this invention an ammonia adsorbing substance is placed in the counter and this substance is of such amount and type that a portion of the ammonia is selectively adsorbed at lower temperatures while when the operating temperature is increased, the ammonia will be desorbed so as to introduce the desired amount of ammonia to fulfill the requirements at higher temperatures.

As suitable ammonia adsorbents, it has been found that silica gel, activated carbon, alumina gel ($Al_2O_3$) and a mixture of alumina and silica gels are satisfactory. Of these, the silica gel is preferred since this material is inert with respect to the other materials in the counter and it can be prepared with a reasonably high surface area of 200 to 500 square meters per gram. Carbon can be prepared having the largest surface area of any of the proposed materials (up to 4,000 square meters per gram), but it may not be as permanent, chemically and structurally, as silica gel. Alumina gel will also be quite satisfactory although it generally has a somewhat smaller surface area, i. e., 105 to 180 square meters per gram and would, therefore, have to be used in correspondingly larger amounts.

The equilibrium pressure of a gas (ammonia) adsorbed on a solid gel (silica) is quantitatively determined by: (1) temperature and (2) ratio of solid mass to mass of adsorbed gas. Therefore, the equilibrium pressure of the ammonia, as a function of temperature increase, can be controlled by proper selection of the ratio of mass of the silica gel or other adsorbent to volume of the counter gas.

In the U. S. Letters Patent No. 2,512,773 mentioned hereinbefore a gamma-ray counter of the multi-cathode plate type is disclosed. While counters of that type have proven to have efficiencies for gamma ray detection several times as high as the conventional Geiger-Mueller counter, it is to be understood that the present invention is not limited to use with a multi-plate counter or to any other particular type. As is well known, gamma-ray detectors of the pulse counter or gas amplification type usually comprise a cathode and an anode disposed within a sealed housing or envelope containing a quenching gas filling and the present invention is concerned with those detectors in which the gaseous filling contains ammonia as a quenching gas component.

The ammonia adsorbent can be disposed within the counter in any suitable manner such as by being placed within a small perforated capsule, by being coated on the walls of the counter envelope or in any other suitable way.

Obviously many modifications and variations of the invention, as hereinbefore set forth, may be made without departing from the spirit and scope thereof, and therefore only such limitations should be omposed as are indicated in the appended claims.

I claim:

1. In a gamma ray detector of the gas amplification type in which a cathode and an anode are disposed in a sealed envelope containing a gaseous filling having ammonia as one of its constituents, means for compensating for increased temperature comprising an adsorbent for ammonia disposed within said envelope said adsorbent being capable of giving up adsorbed ammonia as temperature is increased.

2. In a gamma ray detector of the electrical gas amplification type in which a cathode and an anode are disposed in a sealed envelope containing a gaseous filling having ammonia as one of its constituents, means for increasing the temperature range over which said detector will operate efficiently comprising a small quantity of an ammonia adsorbent disposed within said envelope, said adsorbent being capable of adsorbing ammonia at lower than normal temperatures and then giving up ammonia as the temperature increases.

3. A gamma ray detector as defined in claim 2 in which the adsorbent is silica gel.

4. A gamma ray detector as defined in claim 2 in which the adsorbent is activated carbon.

5. A gamma ray detector as defined in claim 2 in which the adsorbent is alumina gel.

6. A gamma ray detector as defined in claim 2 in which the adsorbent is a mixture of silica and alumina gels.

7. In a gamma ray detector of the electrical gas amplification type in which a cathode and an anode are disposed in a sealed envelope containing a gaseous filling having ammonia as a quenching gas, means for introducing additional ammonia as temperature is increased over a temperature range of approximately 60° F. to 350° F. comprising a small quantity of an ammonia adsorbent disposed within said envelope, said adsorbent being capable of giving up adsorbed ammonia as temperature is increased.

8. In a radioactivity well logging gamma ray detector of the gas amplification type in which a cathode and an anode are disposed in a sealed envelope containing a gaseous filling of approximately 3 per cent ammonia and 97 per cent a rare gas at approximately .9 atmospheric pressure, and a small quantity of an ammonia adsorbent and adsorbed ammonia disposed within said envelope, said adsorbent being capable of desorbing a portion of the said adsorbed ammonia as the temperature increases, said adsorbent being inert to the other materials within the envelope and having a high surface area.

9. A gamma ray detector as defined in claim 8 in which the adsorbent is silica gel.

10. A gamma ray detector as defined in claim 8 in which the adsorbent is activated carbon.

11. A gamma ray detector as defined in claim 8 in which the adsorbent is alumina gel.

12. A gamma ray detector as defined in claim 8 in which the adsorbent is a mixture of silica and alumina gels.

References Cited in the file of this patent

UNITED STATES PATENTS

| | | |
|---|---|---|
| 1,573,105 | Voorhis | Feb. 16, 1926 |
| 1,831,950 | Ewest et al. | Nov. 17, 1931 |
| 2,048,838 | Carter et al. | July 28, 1936 |
| 2,431,676 | Bour | Dec. 2, 1947 |
| 2,497,911 | Reilly et al. | Feb. 21, 1950 |
| 2,599,352 | Schneider | June 3, 1952 |

OTHER REFERENCES

Increased Gamma-Ray . . . etc., Evans et al. Rev. of Scientific Instruments, December 1936, vol. 7, pages 445–6.